(12) United States Patent
Sugiyama et al.

(10) Patent No.: US 9,263,830 B2
(45) Date of Patent: Feb. 16, 2016

(54) CHARGING CONNECTOR

(71) Applicant: YAZAKI CORPORATION, Minato-ku, Tokyo (JP)

(72) Inventors: Daisuke Sugiyama, Shizuoka (JP); Tsutomu Sawada, Shizuoka (JP); Takashi Tsukamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/613,770

(22) Filed: Feb. 4, 2015

(65) Prior Publication Data
US 2015/0155656 A1    Jun. 4, 2015

Related U.S. Application Data

(63) Continuation of application No. PCT/JP2013/070749, filed on Jul. 31, 2013.

(30) Foreign Application Priority Data

Aug. 6, 2012    (JP) ................................. 2012-173857

(51) Int. Cl.
*H01R 13/62*    (2006.01)
*H01R 13/627*   (2006.01)
*B60L 11/18*    (2006.01)

(52) U.S. Cl.
CPC ........ *H01R 13/6272* (2013.01); *B60L 11/1818* (2013.01); *B60L 2270/32* (2013.01); *B60L 2270/34* (2013.01); *Y02T 10/7005* (2013.01); *Y02T 90/14* (2013.01)

(58) Field of Classification Search
CPC ......................... H01R 13/6275; B60L 11/1818
See application file for complete search history.

(56) References Cited

U.S. PATENT DOCUMENTS

| | | | | |
|---|---|---|---|---|
| 5,350,312 A | * | 9/1994 | Kuno .................. | B60L 11/1818 439/310 |
| 5,417,579 A | * | 5/1995 | Yoshioka ............ | B60L 11/1818 439/310 |
| 5,429,524 A | * | 7/1995 | Wakata ................ | B60L 3/0069 439/310 |
| 5,433,623 A | * | 7/1995 | Wakata ................ | B60L 3/0069 439/310 |
| 5,458,496 A | * | 10/1995 | Itou ..................... | B60L 11/1846 439/34 |
| 5,529,510 A | * | 6/1996 | Wakata .............. | H01R 13/2421 439/310 |
| 5,545,049 A | * | 8/1996 | Hasegawa ........... | B60L 11/1818 439/310 |
| 5,556,284 A | * | 9/1996 | Itou ..................... | B60L 11/1846 180/65.1 |
| 5,558,533 A | * | 9/1996 | Hashizawa .......... | B60L 11/1818 439/310 |
| 5,573,417 A | * | 11/1996 | Hashizawa .......... | B60L 11/1818 439/310 |

(Continued)

FOREIGN PATENT DOCUMENTS

JP    H10-275653 A    10/1998
JP    2011-187322 A    9/2011

(Continued)

*Primary Examiner* — Ross Gushi
(74) *Attorney, Agent, or Firm* — Mots Law, PLLC

(57) ABSTRACT

A charging connector includes a connector housing to be fitted to a power receiving connector, a connector case housing the connector housing, a lock arm arranged to be swingable about a swing fulcrum between a lock position and a release position, and a coil spring located toward a power receiving connector away from the swing fulcrum to bias the lock arm toward the lock position. The lock arm is provided with a spring compartment housing the coil spring in a manner such that the periphery of the coil spring is enclosed. The spring compartment is provided, on a bottom portion thereof, with a penetration hole extending in the lock arm.

3 Claims, 4 Drawing Sheets

(56) References Cited

U.S. PATENT DOCUMENTS

| | | | | |
|---|---|---|---|---|
| 5,575,675 A * | 11/1996 | Endo | H01R 13/62933 | 439/310 |
| 5,577,920 A * | 11/1996 | Itou | B60L 11/1846 | 439/310 |
| 5,584,712 A | 12/1996 | Fukushima | H01R 13/4538 | 439/140 |
| 5,637,977 A * | 6/1997 | Saito | B60L 11/1818 | 320/109 |
| 5,674,086 A * | 10/1997 | Hashizawa | B60L 11/1818 | 439/310 |
| 5,676,560 A * | 10/1997 | Endo | B60L 11/1818 | 439/310 |
| 5,751,135 A * | 5/1998 | Fukushima | B60L 11/1818 | 320/107 |
| 5,803,760 A * | 9/1998 | Ito | B60L 11/1818 | 439/310 |
| 5,820,395 A * | 10/1998 | Hashizawa | B60L 11/1818 | 439/271 |
| 5,873,737 A * | 2/1999 | Hashizawa | B60L 11/1818 | 439/310 |
| 5,906,500 A * | 5/1999 | Kakuta | B60L 11/1818 | 439/310 |
| 6,123,569 A * | 9/2000 | Fukushima | B60L 11/1818 | 439/310 |
| 6,225,153 B1 * | 5/2001 | Neblett | B60L 11/1818 | 438/188 |
| 6,283,781 B1 * | 9/2001 | Mori | B60L 11/1818 | 439/310 |
| 6,371,768 B1 * | 4/2002 | Neblett | B60L 11/1818 | 439/34 |
| 7,404,720 B1 * | 7/2008 | Frey | H01R 13/701 | 439/133 |
| 7,878,866 B1 * | 2/2011 | Kwasny | B60L 11/1818 | 439/474 |
| 7,963,793 B2 * | 6/2011 | Poulin | B60L 11/1818 | 439/34 |
| 8,016,604 B2 * | 9/2011 | Matsumoto | B60L 3/0069 | 439/304 |
| 8,016,607 B2 * | 9/2011 | Brown, II | B60L 11/1818 | 439/34 |
| 8,075,329 B1 * | 12/2011 | Janarthanam | B60L 11/1818 | 439/304 |
| 8,128,440 B2 * | 3/2012 | Matsumoto | B60L 11/1818 | 439/731 |
| 8,152,550 B2 * | 4/2012 | Ichio | H01R 13/5227 | 439/304 |
| 8,206,171 B2 * | 6/2012 | Osawa | H01R 13/502 | 439/352 |
| 8,251,742 B2 * | 8/2012 | Takada | B60L 11/1818 | 439/271 |
| 8,317,534 B2 * | 11/2012 | Osawa | B60L 11/1818 | 439/353 |
| 8,342,856 B2 * | 1/2013 | Takada | H01R 13/521 | 439/246 |
| 8,439,699 B2 * | 5/2013 | Ohmura | H01R 13/62933 | 439/157 |
| 8,500,476 B2 * | 8/2013 | Hori | H01R 13/62944 | 439/310 |
| 8,506,315 B2 * | 8/2013 | Canedo | H01R 13/60 | 439/310 |
| 8,523,589 B2 * | 9/2013 | Kurumizawa | H01R 13/6275 | 439/304 |
| 8,523,596 B2 * | 9/2013 | Inoue | G07C 9/00182 | 439/310 |
| 8,529,273 B2 * | 9/2013 | Maegawa | B60L 11/1818 | 439/206 |
| 8,562,370 B2 * | 10/2013 | Takagi | H01R 13/6275 | 439/345 |
| 8,568,155 B2 * | 10/2013 | Sebald | B60L 11/1818 | 439/304 |
| 8,573,994 B2 * | 11/2013 | Kiko | B60L 3/0069 | 320/109 |
| 8,573,998 B2 * | 11/2013 | Ichio | B60L 11/1818 | 439/358 |
| 8,597,046 B2 * | 12/2013 | Osawa | B60L 11/1818 | 439/469 |
| 8,678,845 B2 * | 3/2014 | Osawa | H01R 13/502 | 439/352 |
| 8,747,143 B2 * | 6/2014 | Ichio | B60L 11/1818 | 439/358 |
| 8,784,124 B2 * | 7/2014 | Yeon | H01R 13/629 | 439/299 |
| 8,834,202 B2 * | 9/2014 | Kwasny | B60L 11/1818 | 439/604 |
| 8,882,525 B2 * | 11/2014 | Mori | B60L 11/1818 | 439/310 |
| 8,932,072 B2 * | 1/2015 | Tamaki | H01R 13/6272 | 439/345 |
| 9,048,567 B2 * | 6/2015 | Takagi | H01R 13/6275 | |
| 9,077,110 B2 * | 7/2015 | Ohmura | H01R 13/6275 | |
| 9,088,101 B2 * | 7/2015 | Toratani | H01R 13/6683 | |
| 9,088,110 B2 * | 7/2015 | Ohmura | H01R 13/6275 | |
| 9,106,014 B2 * | 8/2015 | Ohmura | H01R 13/6275 | |
| 9,106,015 B2 * | 8/2015 | Ohmura | H01R 13/6275 | |
| 9,124,035 B2 * | 9/2015 | Ohmura | H01R 13/641 | |
| 9,178,312 B2 * | 11/2015 | Nakajima | B60L 11/1825 | |
| 9,199,551 B2 * | 12/2015 | Kahara | B60L 15/20 | |
| 2011/0212645 A1 * | 9/2011 | Osawa | H01R 13/502 | 439/352 |
| 2011/0223792 A1 * | 9/2011 | Osawa | B60L 11/1818 | 439/345 |
| 2011/0281447 A1 * | 11/2011 | Kano | B60L 11/1818 | 439/133 |
| 2011/0287649 A1 | 11/2011 | Kurumizawa et al. | | |
| 2011/0318950 A1 * | 12/2011 | Ichio | B60L 11/1818 | 439/345 |
| 2012/0129378 A1 * | 5/2012 | Kiko | H01R 13/717 | 439/345 |
| 2013/0012054 A1 * | 1/2013 | Andresen | B60L 11/1818 | 439/476.1 |
| 2013/0303014 A1 * | 11/2013 | Takagi | H01R 13/6275 | 439/350 |
| 2014/0004743 A1 * | 1/2014 | Fukushima | H01R 13/5045 | 439/625 |
| 2014/0045362 A1 * | 2/2014 | Ohmura | H01R 13/6275 | 439/345 |
| 2014/0051277 A1 * | 2/2014 | Ohmura | H01R 13/62933 | 439/347 |
| 2014/0080342 A1 * | 3/2014 | Ohmura | H01R 13/639 | 439/310 |
| 2014/0106586 A1 * | 4/2014 | Boeck | H01R 13/52 | 439/188 |
| 2014/0167695 A1 * | 6/2014 | Shimizu | H01R 13/6275 | 320/109 |
| 2014/0167696 A1 * | 6/2014 | Kahara | B60L 11/1818 | 320/109 |
| 2014/0169865 A1 * | 6/2014 | Kurumizawa | H01R 13/639 | 403/322.1 |
| 2014/0170879 A1 * | 6/2014 | Kahara | B60L 1/003 | 439/304 |
| 2014/0170889 A1 * | 6/2014 | Kahara | H01R 13/6397 | 439/352 |
| 2014/0170890 A1 * | 6/2014 | Kurumizawa | H01R 13/6397 | 439/352 |
| 2014/0235086 A1 * | 8/2014 | Nakajima | B60L 11/1825 | 439/347 |
| 2014/0235087 A1 * | 8/2014 | Nakajima | B60L 11/1818 | 439/347 |
| 2014/0235089 A1 * | 8/2014 | Nakajima | B60L 11/1818 | 439/350 |
| 2014/0242818 A1 * | 8/2014 | Ohmura | B60L 11/1818 | 439/155 |
| 2014/0256172 A1 * | 9/2014 | Kakizaki | B60L 11/1818 | 439/350 |
| 2014/0285148 A1 * | 9/2014 | Osawa | H01R 13/639 | 320/109 |
| 2014/0292276 A1 * | 10/2014 | Osawa | H01R 13/639 | 320/109 |
| 2014/0295714 A1 * | 10/2014 | Guillanton | H01R 13/111 | 439/692 |
| 2014/0300320 A1 * | 10/2014 | Nakajima | H01R 13/6275 | 320/109 |

(56) References Cited

U.S. PATENT DOCUMENTS

| | | | | |
|---|---|---|---|---|
| 2014/0315416 A1* | 10/2014 | Ohmura | H01R 13/641 | 439/352 |
| 2014/0322949 A1* | 10/2014 | Ohmura | H01R 13/6275 | 439/352 |
| 2014/0322950 A1* | 10/2014 | Ohmura | H01R 13/641 | 439/352 |
| 2014/0322951 A1* | 10/2014 | Ohmura | H01R 13/6275 | 439/352 |
| 2014/0322952 A1* | 10/2014 | Ohmura | H01R 13/6275 | 439/352 |
| 2014/0329400 A1* | 11/2014 | Kakizaki | B60L 11/1818 | 439/304 |
| 2014/0357113 A1* | 12/2014 | Fehler | B60L 11/1818 | 439/367 |
| 2015/0011111 A1* | 1/2015 | Toratani | H01R 13/6683 | 439/357 |
| 2015/0035478 A1* | 2/2015 | Uchiyama | B60L 1/003 | 320/107 |
| 2015/0037994 A1* | 2/2015 | Nakajima | H01R 13/6397 | 439/304 |
| 2015/0155656 A1* | 6/2015 | Sugiyama | H01R 13/6272 | 439/370 |
| 2015/0207261 A1* | 7/2015 | Fukushima | B60L 11/1816 | 439/701 |
| 2015/0229074 A1* | 8/2015 | Toratani | B60L 11/1816 | 439/357 |
| 2015/0249305 A1* | 9/2015 | Toratani | H01R 13/639 | 439/357 |
| 2015/0295344 A1* | 10/2015 | Sawada | B60L 11/1818 | 439/587 |

FOREIGN PATENT DOCUMENTS

| | | |
|---|---|---|
| JP | 2011-238535 A | 11/2011 |
| JP | 2011-244590 A | 12/2011 |

* cited by examiner

CHARGING CONNECTOR

CROSS REFERENCE TO RELATED APPLICATIONS

This application is a continuation of International Application No. PCT/JP2013/070749, filed Jul. 31, 2013, and based upon and claims the benefit of priority from Japanese Patent Application No. 2012-173857, filed Aug. 6, 2012, the entire contents of all of which are incorporated herein by reference.

TECHNICAL FIELD

The present application relates to a charging connector used for charging a battery mounted on a vehicle such as an electric vehicle and a hybrid electric vehicle.

BACKGROUND

Conventionally, a charging connector is used for charging a battery mounted on a vehicle such as an electric vehicle (EV) and a hybrid electric vehicle (HEV) (refer to JP H10-275653 A and JP 2011-244590 A). An example of such a charging connector is explained below with reference to FIG. 1.

As illustrated in FIG. 1, a conventional charging connector 100 has a configuration to be fitted into a power receiving connector (not illustrated) provided with a power receiving terminal. The charging connector 100 includes a power supplying terminal (not illustrated), a connector housing 110, a connector case 120, a lock arm 130, and a coil spring 140.

The connector housing 110 houses the power supplying terminal to be connected to the power receiving terminal of the power receiving connector and is thus fitted into the power receiving connector.

The connector case 120 houses the connector housing 110. The connector case 120 includes a housing receiving portion 121 for housing the connector housing 110, a wire receiving portion 122 for housing wires W connected to the power supplying terminal, and a handle 123 connected to the wire receiving portion 122 and held by an operator. The wires W connected to the power supplying terminal are pulled out of the housing receiving portion 121 through the wire receiving portion 122 and the handle 123.

The lock arm 130 prevents removal between the power receiving connector and the connector housing 110 while the fitted state therebetween is kept. The lock arm 130 is arranged between the connector housing 110 and the connector case 120, and extends in the fitted direction between the power receiving connector and the connector case 120.

The lock arm 130 includes a lock claw 131 formed at one end thereof and a lock operating portion 132 formed at the other end. The lock claw 131 and the lock operating portion 132 are exposed to the outside of the connector case 120. The lock operating portion 132 presses a microswitch M that electrically detects the fitted state between the power receiving connector and the connector housing 110.

Such a lock arm 130 is arranged to be swingable about a swing fulcrum 133 to shift between a lock position where the lock claw 131 engages with the power receiving connector and a release position where the engagement between the power receiving connector and the lock claw 131 is released.

The coil spring 140 is located toward the lock operating portion 132 on the side away from the swing fulcrum 133. The coil spring 140 biases the lock arm 130 toward the lock position. Namely, the coil spring 140 biases the lock operating portion 132 of the lock arm 130 upward. The coil spring 140 is supported by a projection 142 formed in a spring receiving portion 141.

When fitting the charging connector 100 into the power receiving connector, the operator holds the handle 123 and moves the charging connector 100 toward the power receiving connector. The lock claw 131 then comes into contact with the power receiving connector, the lock arm 130 swings from the lock position to the release position, and the microswitch M is turned OFF due to the pressure applied from the lock operating portion 312.

Once the charging connector 100 is completely fitted into the power receiving connector, the lock claw 131 engages with the power receiving connector, and the lock arm 130 swings from the release position to the lock position. The microswitch M is then turned ON so as to be ready to charge a battery. Since the lock claw 131 is in the state of engaging with the power receiving connector while the battery is being charged, unintentional disconnection between the power supplying terminal and the power receiving terminal can be prevented.

SUMMARY

In recent years, there has been a demand for reduction in size of the connector case 120 in association with reduction in weight of the charging connector 100. In particular, a size reduction of the wire receiving portion 122 is required. Thus, it may be taken into consideration that the coil spring 140 is placed toward the lock claw 131 on the side away from the swing fulcrum 133 so as to decrease the size of the wire receiving portion 122. In such a case, the coil spring 140 is required to be interposed between the inner surface of the connector case 120 and the upper surface of the lock arm 130 (for example, at position A in FIG. 1) in order to bias the lock arm 130 toward the lock position.

In addition, in order to ensure the stretching space for the coil spring 140 with the connector case 120 miniaturized, a provision of a spring compartment (not illustrated) open to the upper surface of the lock arm 130 cannot be avoided. Further, in order to secure the strength of the lock arm 130, a peripheral wall for enclosing the periphery of the coil spring 140 is required to be provided in the spring compartment.

If the spring compartment is open to the upper surface of the lock arm 130, however, rainwater may enter the connector case 120 from the periphery of the lock claw 131 or lock operating portion 132. The rainwater entering the connector case 120 or moisture including water condensation produced inside the connector case 120 remains inside the spring compartment through the lock arm 130.

Especially in winter, it is expected that the moisture remaining in the spring compartment freezes, which may lead to deterioration in stretching performance of the coil spring 140 and lead to deterioration in swinging performance of the lock arm 130 accordingly.

An object of the present invention is to provide a charging connector capable of ensuring a stretching space for a coil spring and strength of a lock arm with a connector case miniaturized, and preventing deterioration in swinging performance of a lock arm even when moisture enters a spring compartment.

A charging connector according to a first aspect of the present invention includes: a connector housing to be fitted to a power receiving connector and housing a power supplying terminal to be connected to a power receiving terminal of the power receiving connector; a connector case housing the connector housing; a lock arm located in the connector case and arranged to be swingable about a swing fulcrum between a lock position where the lock arm engages with the power receiving connector and a release position where an engagement between the lock arm and the power receiving connector is released; and a coil spring interposed between an inner surface of the connector case and the lock arm and located toward the power receiving connector away from the swing fulcrum to bias the lock arm toward the lock position, the lock arm being provided with a spring compartment open to an upper surface of the lock arm and housing the coil spring in a manner such that a periphery of the coil spring is enclosed, the spring compartment being provided, on a bottom portion thereof, with a penetration hole extending in the lock arm.

Since the penetration hole is formed in the lock arm at the bottom portion of the spring compartment, rainwater entering the connector case or moisture including water condensation produced inside the connector case is discharged from the penetration hole formed at the bottom portion of the spring compartment. Thus, the moisture can be prevented from remaining in the spring compartment. Accordingly, deterioration in stretching performance of the coil spring can be prevented while a freeze of the moisture inside the spring compartment is avoided, and deterioration in swinging performance of the lock arm can be prevented.

Since the spring compartment is open to the upper surface of the lock arm, the stretching space for the coil spring can be ensured compared with the case where the coil spring is simply placed on the upper surface of the lock arm. In addition, the spring compartment houses the coil spring in a manner such that the periphery of the coil spring is enclosed so that the strength of the lock arm can also be ensured.

The bottom portion of the spring compartment may be provided with a projection inserted in the coil spring, and the peripheral surface of the projection may be provided with edge portions.

The edge portions formed on the peripheral surface of the projection formed at the bottom portion of the spring compartment, contribute to preventing adhesion of the moisture to the peripheral surface of the projection caused by surface tension when the moisture enters the spring compartment, so as to reliably prevent the moisture from remaining in the spring compartment.

The lock arm may be provided with lightening grooves in the longitudinal direction of the lock arm, and the penetration hole may communicate with the lightening grooves.

Since the lightening grooves are formed in the lock arm, a reduction in weight of the lock arm and the charging connector can be achieved. In addition, the penetration hole is provided at the bottom portion of the spring compartment in a manner such that the lightening grooves communicate therewith, which simplifies the preparation processing for the penetration hole.

The aspect of the present invention can provide the charging connector capable of ensuring the stretching space for the coil spring and the strength of the lock arm with the connector case miniaturized, and preventing deterioration in swinging performance of the lock arm even if moisture enters the spring compartment.

DETAILED DESCRIPTION

Figure 1:
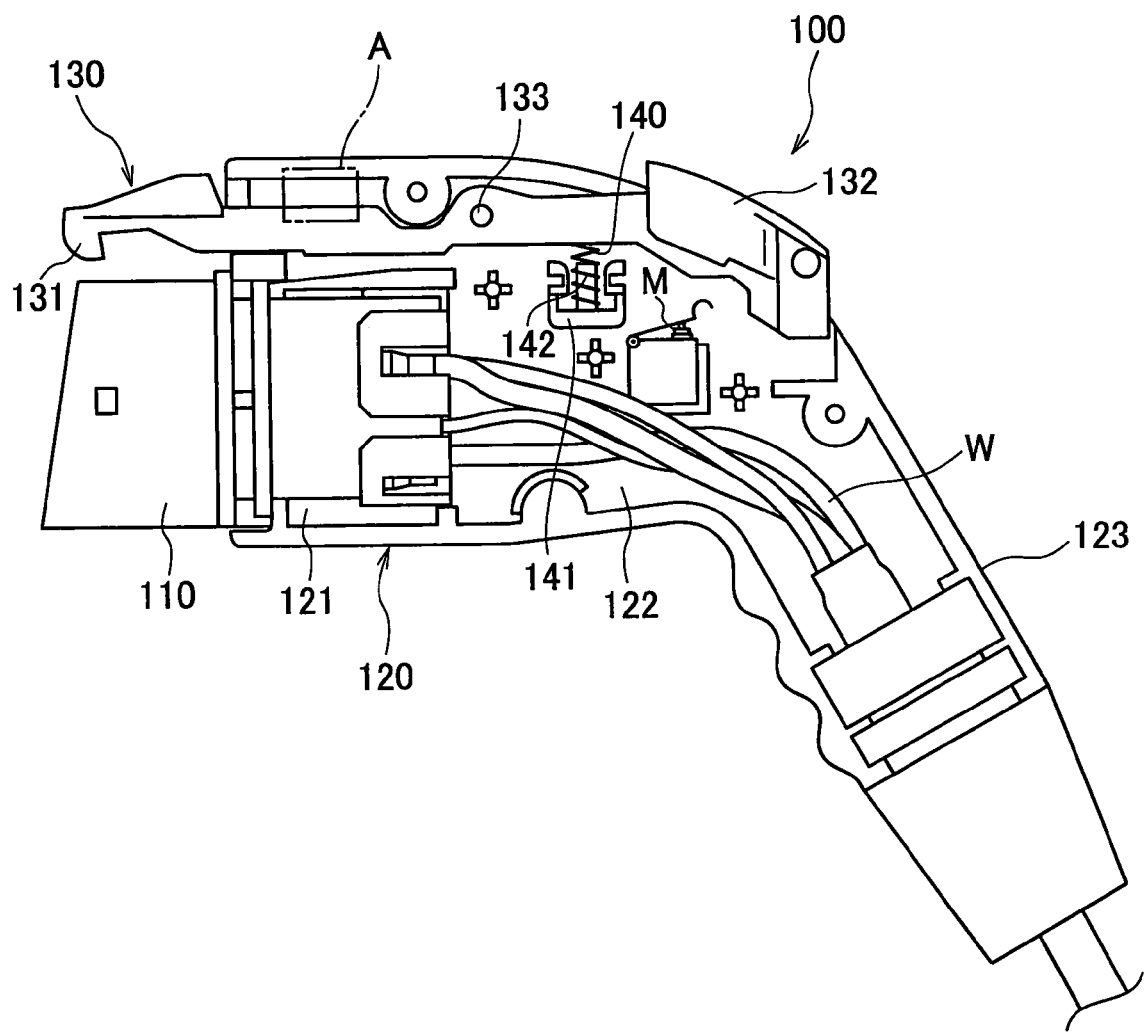
FIG. 1 is a vertical cross-sectional view illustrating the inside of a charging connector according to a conventional example.

A charging connector according to an embodiment of the present invention will be explained below with reference to the drawings. Here, the same or similar elements in the following explanations of the drawings are indicated by the same or similar reference numerals. It should be noted that the respective elements are schematically illustrated in the drawings, and dimensional ratios in the drawings are different from actual ratios. The specific dimensions thus should be taken into consideration in accordance with the following explanations. In addition, the respective drawings may include the elements which are equivalent but differ in dimensional ratio.

A charging connector 1 according to the embodiment is explained below with reference to FIG. 2.

The charging connector 1 (i.e. a power supplying connector) has a configuration to be fitted into a power receiving connector (not illustrated) serving as a charging inlet device provided with a power receiving terminal. The charging connector 1 includes a power supplying terminal (not illustrated), a connector housing 10, a connector case 20, a lock arm 30, and a coil spring 40.

The connector housing 10 is formed substantially into a cylindrical shape and has an insulation property. The connector housing 10 houses the power supplying terminal to be connected to the power receiving terminal and has a shape to be fitted into the power receiving connector (not illustrated).

The connector case 20 has an insulation property and houses the connector housing 10, wires W, and the like. The connector case 20 includes a pair of case bodies formed in a substantially reflection symmetrical manner. The pair of case bodies are assembled in a manner such that peripheral edges thereof are attached and fixed to each other with bolts and nuts. Here, one of the pair of case bodies is only illustrated in FIG. 2 as the connector case 20.

The connector case 20 includes a housing receiving portion 21 for housing the connector housing 10, a wire receiving portion 22 for housing the wires W connected to the power supplying terminal, and a handle 23 connected to the wire receiving portion 22 and held by an operator. The wires W connected to the power supplying terminal are pulled out of the wire receiving portion 22 through the wire receiving portion 22 and the handle 23.

The lock arm 30 prevents removal between the power receiving connector and the connector housing 10 while the fitted state therebetween is kept. The lock arm 30 is arranged to be swingable about a swing fulcrum 31. The lock arm 30 will be explained in more detail below.

The coil spring 40 is interposed between the inner surface of the connector case 20 and the lock arm 30, and located toward the power receiving connector on the side away from the swing fulcrum 31. The coil spring 40 biases the lock arm 30 toward a lock position (indicated by the solid line in FIG. 2).

Next, the configuration of the lock arm 30 is explained below with reference to FIGS. 2 to 4B.

Figure 2:
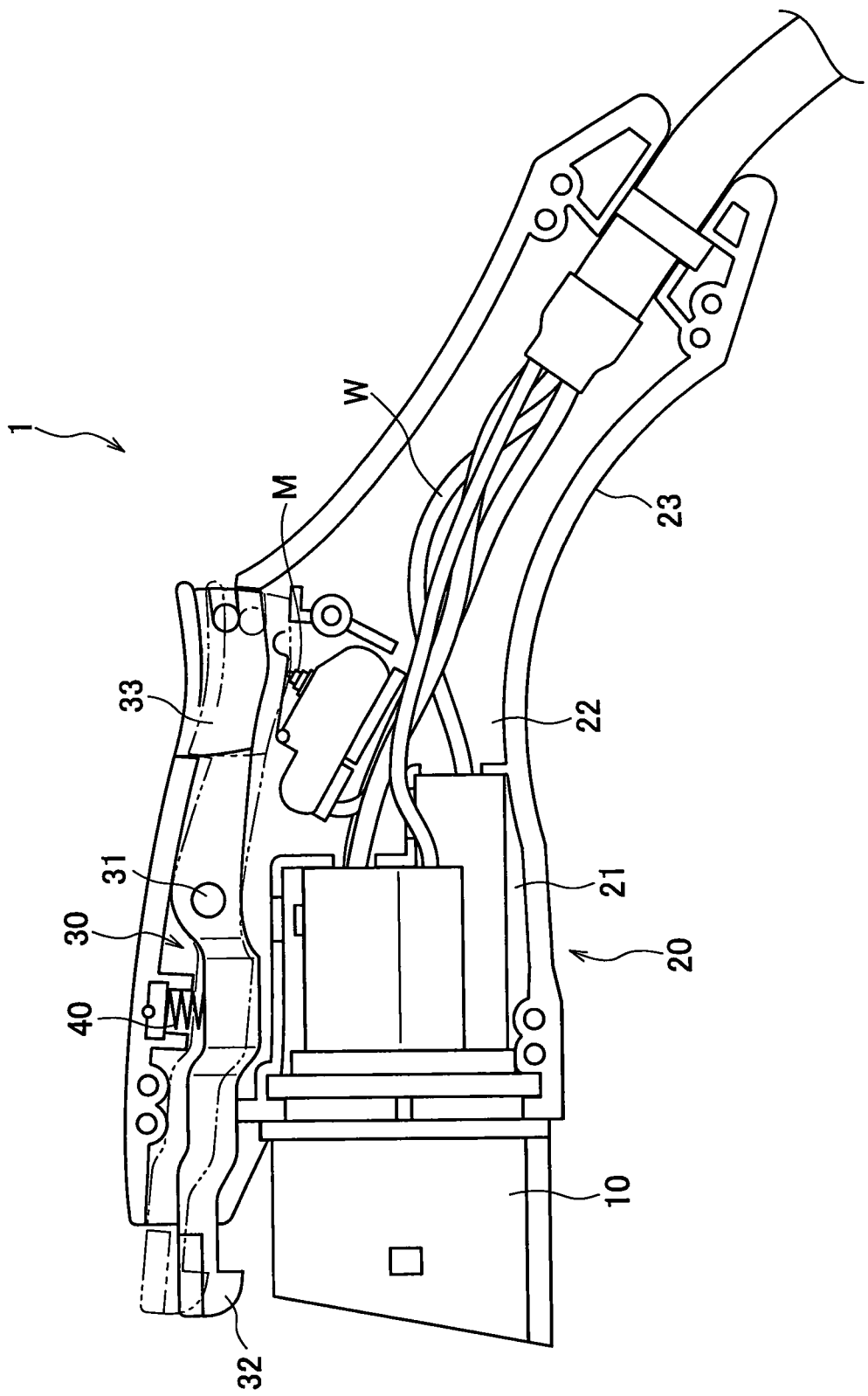
FIG. 2 is a vertical cross-sectional view illustrating the inside of a charging connector according to an embodiment.
Figure 3A:
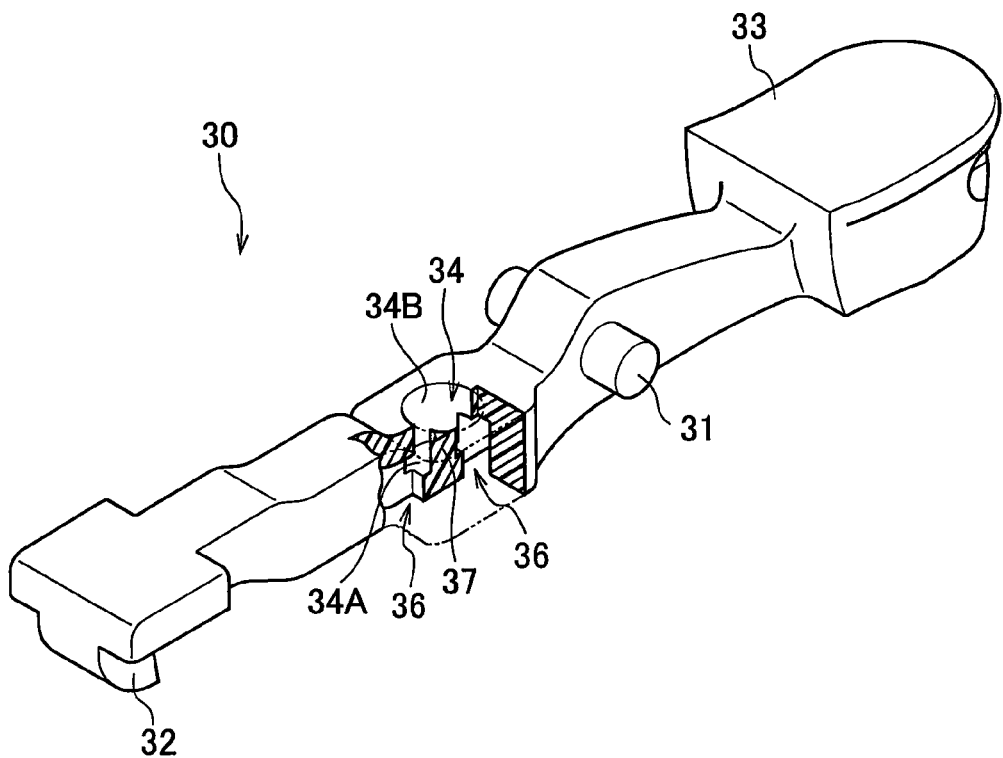
FIG. 3A is a partial cross-sectional perspective view illustrating a lock arm according to the embodiment as viewed from an upper surface side thereof.
Figure 3B:
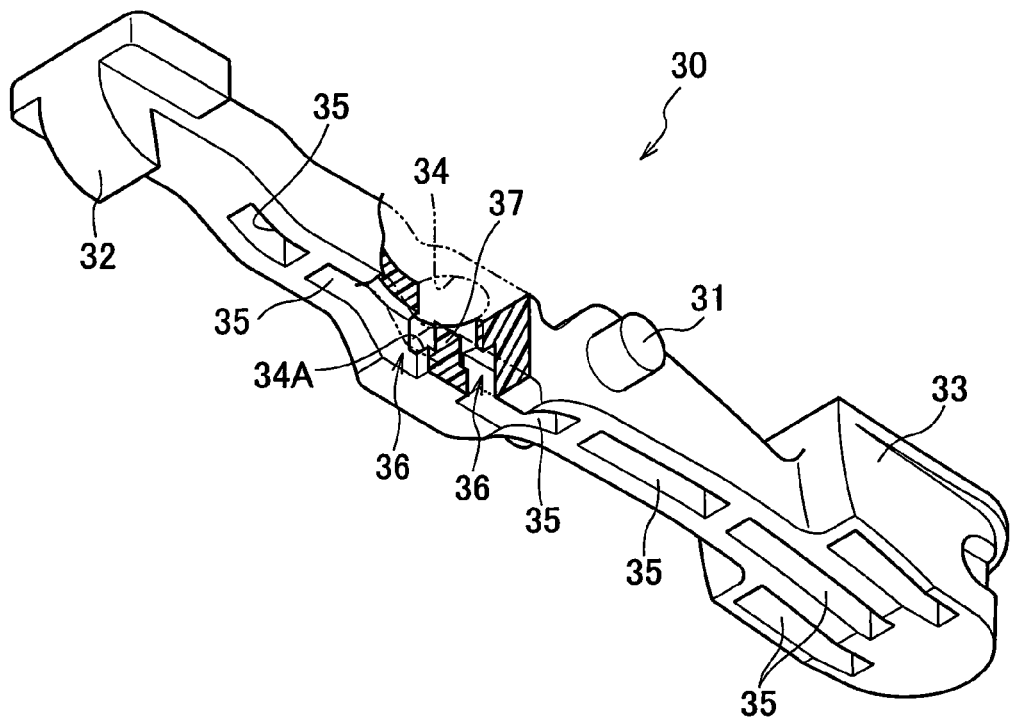
FIG. 3B is a partial cross-sectional perspective view illustrating the lock arm according to the embodiment as viewed from a bottom surface side thereof.
Figure 4A:
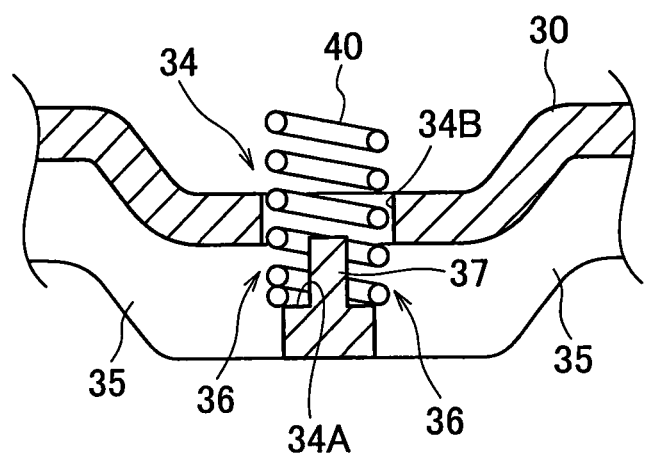
FIG. 4A is a cross-sectional view around a spring compartment of the lock arm according to the embodiment.
Figure 4B:
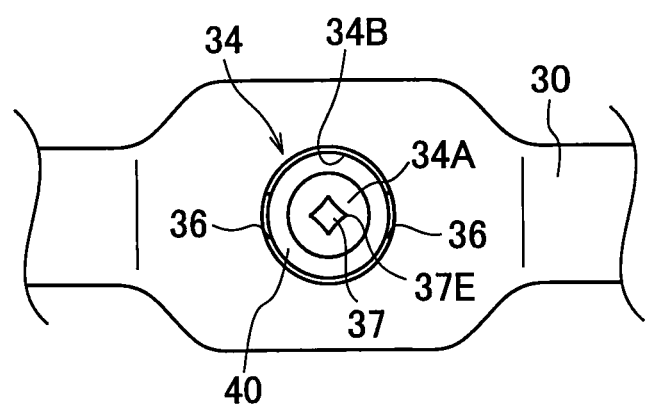
FIG. 4B is a plan view around the spring compartment of the lock arm according to the embodiment.

As illustrated in FIGS. 2, 3A, and 3B, the lock arm 30 is arranged to extend in the fitted direction between the power receiving connector and the connector housing 10. The lock arm 30 is located inside the connector case 20. In particular, the lock arm 30 is located between the connector housing 10 and the connector case 20. The lock arm 30 is arranged to be swingable about the swing fulcrum 31 to move between the lock position where a lock claw 32 engages with the power receiving connector (indicated by the solid line in FIG. 2) and a release position where the engagement between the power receiving connector and the lock claw 32 is released (indicated by the two-dot chain line in FIG. 2).

As illustrated in FIGS. 3A and 3B, the lock arm 30 includes the lock claw 32 formed at one end thereof, and a lock operating portion 33 formed at the other end. The lock claw 32 and the lock operating portion 33 are exposed to the outside of the connector case 20. The lock claw 32 engages with the power receiving connector (not illustrated) when the lock arm 30 is located in the lock position (indicated by the solid line in FIG. 2), and the engagement with the power receiving connector is released when the lock arm 30 is located in the release position (indicated by the two-dot chain line in FIG. 2). The lock operating portion 33 can press a microswitch M that electrically detects the fitted state between the power receiving connector and the connector housing 10. Here, the microswitch M is shifted to a chargeable state (turned ON) when the lock arm 30 is located in the lock position and shifted to a charge-unavailable state (turned OFF) when the lock arm 30 is located in the release position.

The lock arm 30 is provided with a spring compartment 34 arranged between the lock claw 32 and the lock operating portion 33, and a plurality of lightening grooves 35 open to the lower surface of the lock arm 30 and arranged in the longitudinal direction of the lock arm 30.

The spring compartment 34 is open to the upper surface of the lock arm 30, and located toward the power receiving connector away from the swing fulcrum 31. The spring compartment 34 houses the coil spring 40 in a state where the periphery of the coil spring 40 is enclosed. In particular, the spring compartment 34 includes a bottom surface 34A and a peripheral wall 34B. The bottom of the spring compartment 34 is provided with penetration holes 36 extending in the lock arm 30 and a projection 37 to be inserted into the coil spring 40. Here, the bottom of the spring compartment 34 is composed of the bottom surface 34A and part of the peripheral wall 34B (toward the bottom surface 34A).

As illustrated in FIGS. 3A, 3B, 4A, and 4B, the penetration holes 36 are open to the bottom surface 34A and the peripheral wall 34B and also communicate with the lightening grooves 35. The projection 37 is provided, on the peripheral surface thereof, with a plurality of (four in the embodiment) edge portions 37E. At least two edge portions 37E are located to be opposed to the penetration holes 36 and formed to make acute angles in a planar view (refer to FIG. 4B).

The following is a brief explanation of a fitted and separated state between the charging connector 1 and the power receiving connector.

When fitting the charging connector 1 into the power receiving connector, the operator holds the handle 23 and moves the charging connector 1 toward the power receiving connector. The lock claw 32 then comes into contact with the power receiving connector, the lock arm 30 swings from the lock position (indicated by the solid line in FIG. 2) to the release position (indicated by the two-dot chain line in FIG. 2), and the microswitch M is thus turned OFF.

Once the charging connector 1 is completely fitted into the power receiving connector, the lock claw 32 engages with the power receiving connector due to the pressure applied from the coil spring 40, and the lock arm 30 swings from the release position (indicated by the two-dot chain line in FIG. 2) to the lock position (indicated by the solid line in FIG. 2). The microswitch M is then turned ON so as to be ready to charge a battery. In other words, the charge of the battery is not started during the process of fitting the charging connector 1 into the power receiving connector (until complete fitting) so that no arc discharge occurs.

When removing the charging connector 1 from the power receiving connector, the operator presses the lock operating portion 33 in order to release the engagement between the power receiving connector and the lock claw 32. The lock arm 30 then swings from the lock position (indicated by the solid line in FIG. 2) to the release position (indicated by the two-dot chain line in FIG. 2), and the microswitch M is turned OFF so as to stop charging the battery.

Subsequently, the operator moves the charging connector 1 in the direction away from the power receiving connector in the state where the lock arm 30 is located in the release position (indicated by the two-dot chain line in FIG. 2), so as to completely remove the charging connector 1 from the power receiving connector. Namely, the charge of the battery is stopped during the process of removing the charging connector 1 from the power receiving connector so that no arc discharge occurs.

The charging connector 1 according to the embodiment can ensure the following effects.

The bottom of the spring compartment 34 is provided with the penetration holes 36 extending in the lock arm 30. Even if rainwater entering the connector case 20 or moisture such as water condensation produced inside the connector case 20 enters the spring compartment 34, the moisture is discharged from the penetration holes 36 formed at the bottom of the spring compartment 34. Thus, the moisture is prevented from remaining in the spring compartment 34. Accordingly, deterioration in stretching performance of the coil spring 40 can be prevented while a freeze of the moisture inside the spring compartment 34 is avoided, and deterioration in swinging performance of the lock arm 30 can be prevented accordingly.

The spring compartment 34 is open to the upper surface of the lock arm 30. Compared with the case where the coil spring 140 is simply placed on the upper surface of the lock arm 30, the stretching space for the coil spring 140 can be ensured. In addition, the spring compartment 34 houses the coil spring 140 in a manner such that the periphery of the coil spring 140 is enclosed so that the strength of the lock arm 30 can also be ensured.

The peripheral surface of the projection 37 formed on the bottom surface 34A of the spring compartment 34 is provided with the edge portions 37E. The edge portions 37E contribute to preventing adhesion of moisture to the peripheral surface of the projection 37 caused by surface tension of the moisture when the moisture enters the spring compartment 34, so as to reliably prevent the moisture from remaining in the spring compartment 34.

Since the lightening grooves 35 are formed in the lock arm 30, a reduction in weight of the lock arm 30 and the charging connector 1 can be achieved. The penetration holes 36 are provided at the bottom portion of the spring compartment 34 (at the bottom surface 34A and the peripheral wall 34B) in a manner such that the lightening grooves 35 communicate therewith, which simplifies the preparation processing for the penetration holes 36.

Although the details of the present invention have been disclosed by way of the embodiment described above, the present invention should not be deemed to be limited to the descriptions and the drawings composing part of the disclosure. It will be apparent to those skilled in the art from the disclosure that various alternative embodiments, examples and implementations can be made.

The embodiment described above may be modified as follows.

The embodiment exemplified the charging connector 1 for charging the battery (not illustrated) mounted on a vehicle such as an electric vehicle (EV) or a hybrid electric vehicle (HEV). However, the embodiment is not limited to this and may be applied to a charging connector for charging other batteries. The configurations of the respective elements of the charging connector 1 are not limited to those described in the embodiment described above, and other practical configurations may be employed.

The embodiment exemplified the bottom surface 34A of the spring compartment 34 provided with the projection 37. However, the embodiment is not limited to this or is not required to be provided with the projection 37. In addition, the projection 37 is not required to have the edge portions 37E and, for example, may be formed into a cylindrical shape.

The embodiment exemplified the lock arm 30 provided with the lightening grooves 35. However, the embodiment is not limited to this or is not required to be provided with the lightening grooves 35. When the lock arm 30 is not provided with the lightening grooves 35, the penetration holes 36 may be open to the bottom surface of the lock arm 30 through the bottom surface 34A of the spring compartment 34, or may be open to the bottom surface of the lock arm 30 through the peripheral wall 34B of the spring compartment 34 around the bottom surface 34A.

The present invention thus includes various embodiments not described in the specification. Therefore, the scope of the present invention is defined only by the appropriate features according to the claims in view of the explanations made above.

What is claimed is:

1. A charging connector, comprising:
    a connector housing to be fitted to a power receiving connector and housing a power supplying terminal to be connected to a power receiving terminal of the power receiving connector;
    a connector case housing the connector housing;
    a lock arm located in the connector case and arranged to be swingable about a swing fulcrum between a lock position where the lock arm engages with the power receiving connector and a release position where an engagement between the lock arm and the power receiving connector is released; and
    a coil spring interposed between an inner surface of the connector case and the lock arm and located toward the power receiving connector away from the swing fulcrum to bias the lock arm toward the lock position,
    the lock arm being provided with a spring compartment open to an upper surface of the lock arm and housing the coil spring in a manner such that a periphery of the coil spring is enclosed,
    the spring compartment being provided, on a bottom portion thereof, with a penetration hole extending in the lock arm.

2. The charging connector according to claim 1, wherein
    the bottom portion of the spring compartment is provided with a projection inserted in the coil spring, and
    a peripheral surface of the projection is provided with an edge portion.

3. The charging connector according to claim 1, wherein
    the lock arm is provided with a lightening groove in a longitudinal direction of the lock arm, and
    the penetration hole communicates with the lightening groove.

\* \* \* \* \*